Patented Mar. 30, 1948

2,438,754

UNITED STATES PATENT OFFICE 2,438,754

COPPER CONTAINING DISAZO DYESTUFFS

Adolf Krebser, Riehen, near Basel, and Werner Bossard, Basel, Switzerland, assignors to the firm J. R. Geigy A. G., Basel, Switzerland No Drawing. Application March 1, 1943, Serial No. 477,630. In Switzerland April 28, 1942

11 Claims. (Cl. 260—148)

It has been found that valuable new copper-containing disazo dyestuffs are obtained by coupling a diazotised amino sulfonic acid of the benzene or naphthalene series, which contains, in o-position to the amino group, a hydroxy group or a substituent convertible into a hydroxy group by coppering, with a 1:3-dihydroxy-benzene, then causing a diazonium compound which is free from sulfonic acid groups to react with the said monoazo dyestuff and after-treating the so-obtained disazo dyestuff with copper-yielding agents, with the condition that at least one of the diazo components is substituted by a phenyl nucleus bound by a non-basic bridge. The same copper-containing disazo dyestuff is obtained by coppering the monoazo dyestuff obtained from the first diazo component and the 1:3-dihydroxy benzene and coupling this copper compound with the second diazo component and also by finally treating the completely formed disazo dyestuff with copper-yielding agents.

As non-basic bridges between two phenyl nuclei of the diazo components there may be enumerated for instance:
—SO$_2$—, —SO$_2$NC$_2$H$_5$—, —OSO$_2$—, —O—, —CO—, and the like. From the above definition the following three types of dyestuffs may be derived:

(a) The first diazonium component is mononuclear, while the second diazonium body contains two aryl nuclei linked together by a non-basic bridge, (b) The first diazonium compound contains two aryl nuclei united together by a non-basic bridge, while the second diazonium component is mononuclear, and (c) The first as well as the second diazonium compound contain two aryl nuclei bound together by a non-basic bridge.

The first diazonium compound may be prepared from the following amines:

For the dyestuffs of the type (a): 2-amino-1-hydroxy-, -methoxy- or -benzyloxybenzene-4-sulfonic acid, 4- or 6-methyl-2-amino-1-hydroxy- or ethoxybenzene sulfonic acid, 4- or 6-chloro-2-amino-1-hydroxy- or -methoxybenzene sulfonic acid, 4- or 6-nitro-2-amino-1-hydroxy- or -methoxybenzene sulfonic acid, 1-amino-2-hydroxynaphthalene-4-sulfonic acid, 6-nitro-2-amino-1-hydroxynaphthalene-4-sulfonic acid.

For the dyestuffs of the type (b) and (c): 3-amino-4-hydroxy-, -methoxy- or -chloro-1:1'-diphenylsulfone-5- or -3'-sulfonic acid, 3-amino-4-hydroxy- or methoxybenzene-1-sulfonic acid ethylanilide-3'- or -4'-sulfonic acid, 3-amino-4-hydroxy- or -methoxybenzene-1-sulfonic acid phenylester-3'-sulfonic acid, 3-amino-4-hydroxy-1:1'-diphenylether sulfonic acid.

The second diazonium compound can be obtained from the following amines:

For the dyestuffs of the type (a) and (c): 4- or 6-methyl- or -methoxy- or -chloro-3-amino-1:1'-diphenylsulfone, 4- or 6-methyl-, -methoxy- or -chloro-3-aminobenzene-1-sulfonic acid ethylanilide, 4- or 6-methyl-, -methoxy- or -chloro-3-aminobenzene-1-sulfonic acid phenyl- or cresyl ester, 2-, 3- or 4-amino-1-hydroxybenzene-benzene, -toluene- or -chlorobenzene sulfonic acid ester, 2- or 4-amino-1:1'-diphenyl ether, its alkyl- or halogen substitution products.

For the dyestuffs of the type (b): 2-methyl-, methoxy- or -chloro-4- or -5-nitro-1-aminobenzene.

The dyestuffs obtained according to the present invention possess excellent drawing properties, when applied to silk from a neutral dyebath. Beside good washing- and water-fastness properties they are especially distinguished by an excellent light-fastness.

The present invention is illustrated, but not limited, by the following examples, the parts being by weight, unless otherwise stated.

Example 1

32.9 parts of 3-amino-4-hydroxy-1:1'-diphenyl-sulfone-3'-sulfonic acid are dissolved with 6 parts of sodium carbonate in water, then intermixed with 6.9 parts of sodium nitrite and diazotised by allowing to run into 23 parts of hydrochloric acid at 5° C. The diazo compound thus partly precipitated is combined with 11 parts of 1:3-dihydroxybenzene in a caustic alkaline medium. For the conversion of the monoazo dyestuff, which has been separated out in an acid medium, into the copper complex compound it is stirred at 90° C. for 30 minutes with 25 parts of crystallised copper sulfate, then salted out, separated and again suspended. Now, it is coupled in an acetic acid medium with the diazo compound from 24.7 parts of 4-methyl-3-amino-1:1'-diphenylsulfone and the copper-containing disazo dyestuff is finally precipitated by means of sodium chloride. This dyestuff dyes animal fibres in yellowish-brown shades of excellent light- and washing-fastness.

When, on the other hand, the coupling of the coppered monoazo dyestuff is carried out with the diazonium compound from 16.8 parts of 5-nitro-2-amino-1-methoxybenzene instead of with diazotised 4-methyl-3-amino-1:1'-diphenylsulfone, a dyestuff of equally good fastness properties is obtained which gives dark-brown shades on fibres.

Example 2

The diazo compound from 18.9 parts of 2-amino-1-hydroxybenzene-4-sulfonic acid is combined with a caustic alkaline solution of 11 parts of 1:3-dihydroxybenzene. When the coupling has completed, the monoazo dyestuff is precipitated by means of hydrochloric acid, then isolated and coupled in an acetic acid solution with the diazo body obtained from 21.9 parts of 4-chloro-2-amino-1:1'-diphenyl ether. The disazo dyestuff precipitated by means of sodium chloride is dissolved in 2000 parts of water at 80° C., treated with 25 parts of crystallised copper sulfate and the whole is maintained for 1 hour at 90° C. The copper-containing dyestuff thus precipitated is filtered off and converted into the sodium salt by means of known methods. It dyes silk in deep brown shades of very good fastness properties.

Example 3

11 parts of 1:3-dihydroxybenzene are combined at 0° C., in the presence of 14 parts of sodium hydroxide, with the diazo compound obtained from 37.2 parts of 3-amino-4-hydroxybenzene-1-sulfonic acid ethylanilide-4'-sulfonic acid. The monoazo dyestuff isolated in an acid medium and again dissolved in water is treated for 1 hour with 25 parts of crystallised copper sulfate. The monoazo dyestuff thus coppered is then separated, dissolved in water and coupled in an acetic acid suspension with the diazo compound from 16.8 parts of 5-nitro-2-amino-1-methoxybenzene. The dyestuff, worked up as described in Example 2, dyes wool and silk in dark brown shades of excellent fastness properties.

Example 4

23.4 parts of 4-nitro-2-amino-1-hydroxybenzene-6-sulfonic acid diazotised according to usual methods are combined at 0° C. with 11 parts of 1:3-dihydroxybenzene in 50 parts of water and 14 parts of sodium hydroxide. After 4 hours the monoazo dyestuff thus formed is precipitated by means of hydrochloric acid, filtered off and coupled in an acetic acid suspension with the diazo body from 19.6 parts of 2'-methyl-2-amino-1:1'-diphenyl ether. In order to convert the disazo dyestuff into the copper complex compound it is treated at 90° C. with 25 parts of crystallised copper sulfate, then precipitated and converted into the sodium salt in the usual manner. It dyes wool and silk in vivid brown shades of good light and wetting fastness.

Example 5

20.3 parts of 2-amino-1-methoxybenzene-4-sulfonic acid are diazotised in the usual manner, coupled in a soda alkaline solution with 11 parts of 1:3-dihydroxybenzene and separated out by acidifying the solution. For the conversion of the monoazo dyestuff into the copper complex compound the same is dissolved in water and boiled for several hours in the presence of 20 parts of sodium acetate with 25 parts of crystallised copper sulfate. The copper-containing o-hydroxy azo dyestuff is finally coupled with the diazo compound from 24.7 parts of 4-methyl-3-amino-1:1'-diphenylsulfone in an acetic acid suspension thus giving the disazo dyestuff. The formation of the dyestuff can be accelerated by gradually neutralising the solution with dilute sodium carbonate solution. The dyestuff so obtained dyes silk in reddish-brown shades of good fastness properties.

Example 6

The monoazo dyestuff obtainable according to Example 1 from 32.9 parts of 3-amino-4-hydroxy-1:1'-diphenylsulfone-3'-sulfonic acid and 11 parts of resorcinol is coppered, as mentioned in the said Example 1, by means of 25 parts of crystallised copper sulfate and coupled in an acetic acid solution with the diazo compound from 26.1 parts of the p-toluene sulfonic acid ester of the 4-aminophenol. The completely formed dyestuff is precipitated by means of sodium chloride. It dyes silk and wool in fast yellowish-brown shades.

When, instead of the monoazo dyestuff obtained according to Example 1, there is used that obtainable according to Example 2 from 18.9 parts of diazotised 2-amino-1-hydroxybenzene-4-sulfonic acid and 11 parts of 1:3-dihydroxybenzene and worked up as indicated above, a dyestuff is obtained which dyes animal fibres in reddish-brown shades of similar fastness properties.

Example 7

34.5 parts of 3-amino-4-hydroxybenzene-1-sulfonic acid phenyl-ester-3'-sulfonic acid are diazotised indirectly and coupled at 0° C. in the presence of exceeding caustic soda lye with 11 parts of 1:3-dihydroxybenzene. The monoazo-dyestuff isolated by acidification is converted at 80° C. into the copper complex compound by adding 25 parts of crystallised copper sulfate and coupled with the diazo compound from 24.7 parts of 4-methyl-3-amino-1:1'-diphenylsulfone. As soon as the dyestuff formation is completed, the mixture is salted out with sodium chloride and then filtered off. The copper-containing disazo dyestuff dyes wool and silk in brown shades of good fastness properties.

In the following table further examples illustrating the present invention are enumerated:

| Example | 1st diazo compound | middle component | 2nd diazo compound | dyeing of the copper complex compound |
|---|---|---|---|---|
| 8 | 6-methyl-2-amino-1-hydroxybenzene-4-sulfonic acid. | 1:3-dihydroxybenzene. | 4'-aminophenyl-4-methylbenzene sulfonic acid ester. | brown. |
| 9 | 3-amino-4-hydroxybenzene-1-sulfonic acid-methyl-anilide-4'-sulfonic acid. | ___do___ | 4-methyl-3-amino-1:1'-diphenyl-sulfone. | yellowish-brown. |
| 10 | 3-amino-4-hydroxy-1:1'-diphenylsulfone-3'-sulfonic acid. | ___do___ | 4'-amyl-2-amino-1:1'-diphenyl ether. | Do. |
| 11 | 4-nitro-1-amino-2-hydroxynaphthalene-6-sulfonic acid. | ___do___ | 6-methyl-3-amino-1:1'-diphenyl-sulfone. | violet brown. |
| 12 | 4-chloro-2-amino-1-hydroxybenzene-6-sulfonic acid. | ___do___ | 4-methoxy-3-amino-1:1'-diphenylsulfone. | brown. |
| 13 | 2-amino-1-methoxy-benzene-4-sulfonic acid. | ___do___ | 6-chloro-3-amino-1:1'-diphenylsulfone. | reddish-brown. |
| 14 | 3-amino-4-hydroxybenzene-1-sulfonic acid-ethylanilide-3'-sulfonic acid. | ___do___ | 2'-methyl-2-amino-1:1'-diphenyl ether. | brown. |
| 15 | 6-methyl-2-amino-1-hydroxybenzene-4-sulfonic acid. | β-resorcylic acid. | 3-amino-6-phenylamino-1:1'-diphenylsulfone. | red-brown. |
| 16 | 3-amino-4-hydroxybenzene-1-sulfonic acid-ethyl-anilide-4'-sulfonic acid. | 1:3-dihydroxy-benzene. | ___do___ | Do. |
| 17 | 2-amino-1-hydroxybenzene-4-sulfonic acid. | ___do___ | 3-aminobenzophenone. | brown. |
| 18 | 3-amino-4-hydroxy-1:1'-diphenylsulfone-3'-sulfonic acid. | ___do___ | 4-methoxy-3-amino-1:1'-diphenylsulfone. | nigger-brown. |
| 19 | ___do___ | ___do___ | 2-methyl-5-nitro-1-aminobenzene. | yellowish-brown. |
| 20 | ___do___ | ___do___ | 2-chloro-5-nitro-1-aminobenzene. | olive-brown. |
| 21 | 2-amino-1-hydroxybenzene-4-sulfonic acid. | ___do___ | 2':4'-dichloro-2-amino-1:1'-diphenyl ether. | reddish-brown. |
| 22 | ___do___ | ___do___ | 3-aminobenzene-sulfonic acid-2'cresyl-ester. | Do. |
| 23 | 2-amino-1-methoxybenzene-4-sulfonic acid. | ___do___ | 4-chlorobenzene-sulfonic acid-4'-aminophenyl ester. | Do. |
| 24 | 2-amino-1-hydroxybenzene-4-sulfonic acid. | β-resorcylic acid. | 6-methyl-3-amino-benzene-sulfonic acid ethylanilide. | Do. |
| 25 | ___do___ | 1:3-dihydroxybenzene. | 4-methylbenzene-sulfonic acid-2'-aminophenyl ester. | brown. |
| 26 | 2-amino-1-ethoxy-benzene-4-sulfonic acid. | ___do___ | 3-aminobenzoyl-ethylanilide. | reddish-brown. |
| 27 | 1-amino-2-hydroxy-naphthalene-4-sulfonic acid. | ___do___ | 2-amino-2'-methyl-1:1'-diphenyl ether. | grey. |
| 28 | 3-amino-4-hydroxy-1:1'-diphenylsulfone-5-sulfonic acid. | ___do___ | 4-methyl-3-amino-1:1'diphenyl-sulfone. | brown. |
| 29 | ___do___ | ___do___ | 4-aminobenzophenone. | Do. |

What we claim is:

1. A process for the manufacture of copper-containing disazo dyestuffs of the general formula

A—N=N—B—N=N—C wherein A stands for a sulfonated aryl radical of the benzene series containing in o-position to the azo group a group capable of being coppered, B stands for a radical of a 1:3-dihydroxybenzene and C stands for an unsulfonated aryl radical of the benzene series, which comprises diazotising an aminoarylsulfonic acid of the benzene series containing in o-position to the amino group a group capable of being coppered, coupling the diazo compound with a 1:3-dihydroxybenzene and coupling the monoazo dyestuff with a diazotised unsulfonated arylamine of the benzene series, with the condition that at least one of the radicals A and C is linked to a benzene radical by means of a member selected from the group consisting of —SO₂—, —SO₂N—alkyl—

—SO₂—O—, —O—, and —CO—, and converting the dyestuff into its copper complex compound.

2. A process for the manufacture of copper-containing disazo dyestuffs of the general formula

A—N=N—B—N=N—C wherein A stands for a sulfonated aryl radical of the benzene series containing in o-position to the azo group a group capable of being coppered, B stands for a radical of a 1:3-dihydroxybenzene and C stands for an unsulfonated aryl radical of the benzene series, which comprises diazotising an aminoarylsulfonic acid of the benzene series containing in o-position to the amino group a group capable of being coppered, coupling the diazo compound with a 1:3-dihydroxybenzene, converting the monoazo dyestuff into its copper complex compound and coupling the coppered monoazo dyestuff with a diazotised unsulfonated arylamine of the benzene series, with the condition that at least one of the radicals A and C is linked to a benzene radical by means of a member selected from the group consisting of —SO₂—, —SO₂N—alkyl—

—SO₂—O—, —O—, and —CO—.

3. A process for the manufacture of copper-containing diazo dyestuffs of the general formula

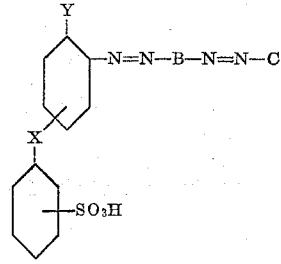

wherein B stands for a radical of a 1:3-dihydroxybenzene, C stands for an unsulfonated aryl radical of the benzene series and X stands for a member selected from the group consisting of —SO₂—, —SO₂N—alkyl—

—SO₂—O—, —O—, and —CO—, while Y represents a group capable of being coppered, which comprises coupling a 1:3-dihydroxybenzene with a diazotised amine of the formula

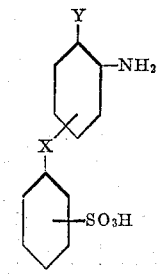

wherein X and Y have the above mentioned significations, converting the monoazo dyestuff into its copper complex compound and coupling the monoazo dyestuff with a diazotised unsulfonated arylamine of the benzene series.

4. A process for the manufacture of copper-containing disazo dyestuffs of the formula

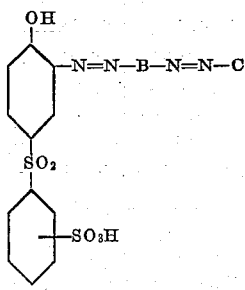

wherein B stands for a radical of a 1:3-dihydroxybenzene and C stands for an unsulfonated aryl radical of the benzene series, which comprises coupling a 1:3-dihydroxybenzene with a diazotised 3-amino-4-hydroxy-1:1'-diphenylsulfone sulfonic acid of the formula

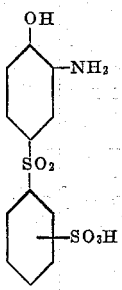

converting the monoazo dyestuff into its copper complex compound and coupling the monoazo dyestuff with a diazotised unsulfonated arylamine of the benzene series.

5. A process for the manufacture of a copper-containing disazo dyestuff of the formula

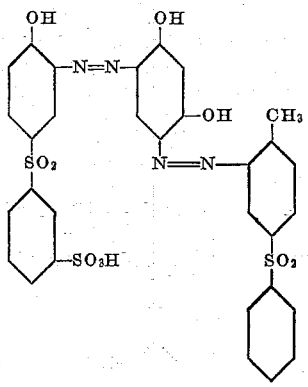

which comprises coupling 1:3-dihydroxybenzene with diazotised 3 - amino - 4 - hydroxy - 1:1'-diphenylsulfone-3'-sulfonic acid, converting the dyestuff into its copper complex compound and coupling the monoazo dyestuff with diazotised 3-amino-4-methyl-1:1'-diphenylsulfone.

6. A process for the manufacture of a copper-containing diazo dyestuff of the formula

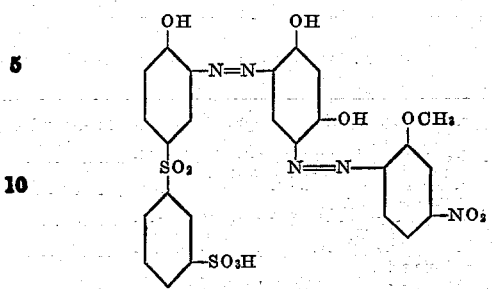

which comprises coupling 1:3-dihydroxybenzene with diazotised 3 - amino - 4 - hydroxy-1:1'-diphenylsulfone-3'-sulfonic acid, converting the dyestuff into its copper complex compound and coupling the monoazo dyestuff with diazotised 2-amino-1-methoxy-5-nitrobenzene.

7. A process for the manufacture of a copper-containing disazo dyestuff of the formula

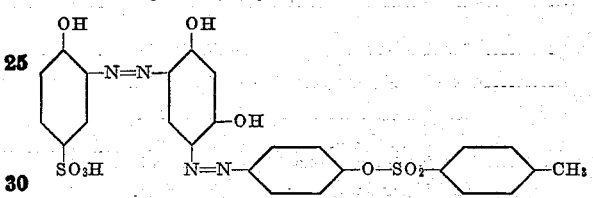

which comprises coupling 1:3-dihydroxybenzene with diazotised 2-amino-1-hydroxybenzene-4-sulfonic acid, converting the monoazo dyestuff into its copper complex compound and coupling the monoazo dyestuff with diazotised 4-amino-1-hydroxy-benzene-p-toluenesulfonic acid ester.

8. The copper-containing dyestuffs of the general formula

A—N=N—B—N=N—C wherein A stands for a sulfonated aryl radical of the benzene series containing in o-position to the azo group a group capable of being coppered, B stands for a radical of a 1:3-dihydroxybenzene and C stands for an unsulfonated aryl radical of the benzene series and wherein at least one of the groups A and C is linked to a benzene radical by means of a member selected from the group consisting of —SO₂—,

—SO₂—O—, —O—, and —CO—, being dark powders dissolving in water with brownish color, in concentrated sulfuric acid with orange to red color and dyeing fibres in brown shades of excellent fastness if coppered.

9. The copper-containing dyestuff of the formula

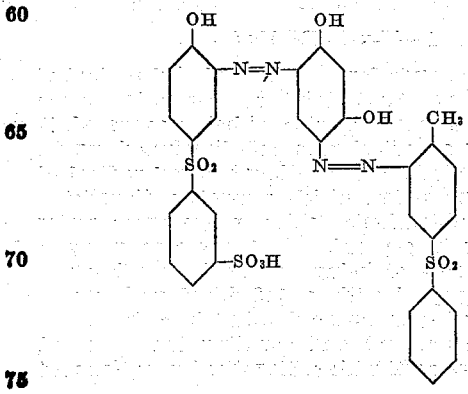

being a dark powder dissolving in water with yellowish brown color, in concentrated sulfuric acid with orange color and dyeing fibres in yellowish brown shades of excellent fastness to light and washing if coppered.

10. The copper-containing dyestuff of the formula

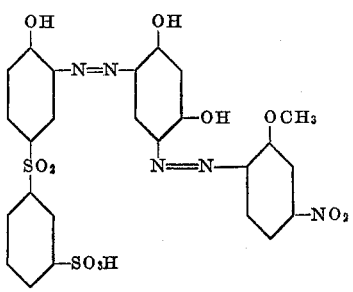

being a dark powder dissolving in water with olive-brown color, in concentrated sulfuric acid with red color and dyeing fibres in dark brown shades of very good fastness to light and washing if coppered.

11. The copper-containing dyestuff of the formula

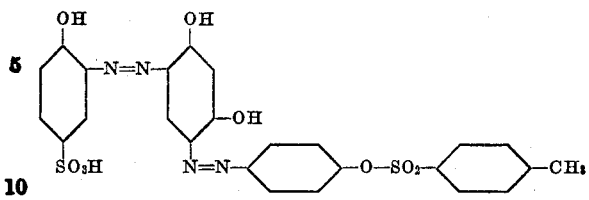

being a dark powder dissolving in water with yellowish brown color, in concentrated sulfuric acid with orange color and dyeing fibres in reddish brown shades of very good fastness if coppered.

ADOLF KREBSER.
WERNER BOSSARD.

REFERENCES CITED

The following references are of record in the file of this patent:

UNITED STATES PATENTS

| Number | Name | Date |
|---|---|---|
| 2,117,731 | Kollmann | May 17, 1938 |
| 2,135,433 | Delfs et al. | Nov. 1, 1938 |
| 2,160,448 | Wehrli | May 30, 1939 |
| 2,257,165 | Fellmer | Sept. 30, 1941 |